Nov. 4, 1930.  E. K. EVANS  1,780,583
AUTOMATIC PRESSURE CONTROLLING APPARATUS
Filed Sept. 8, 1928  2 Sheets-Sheet 1
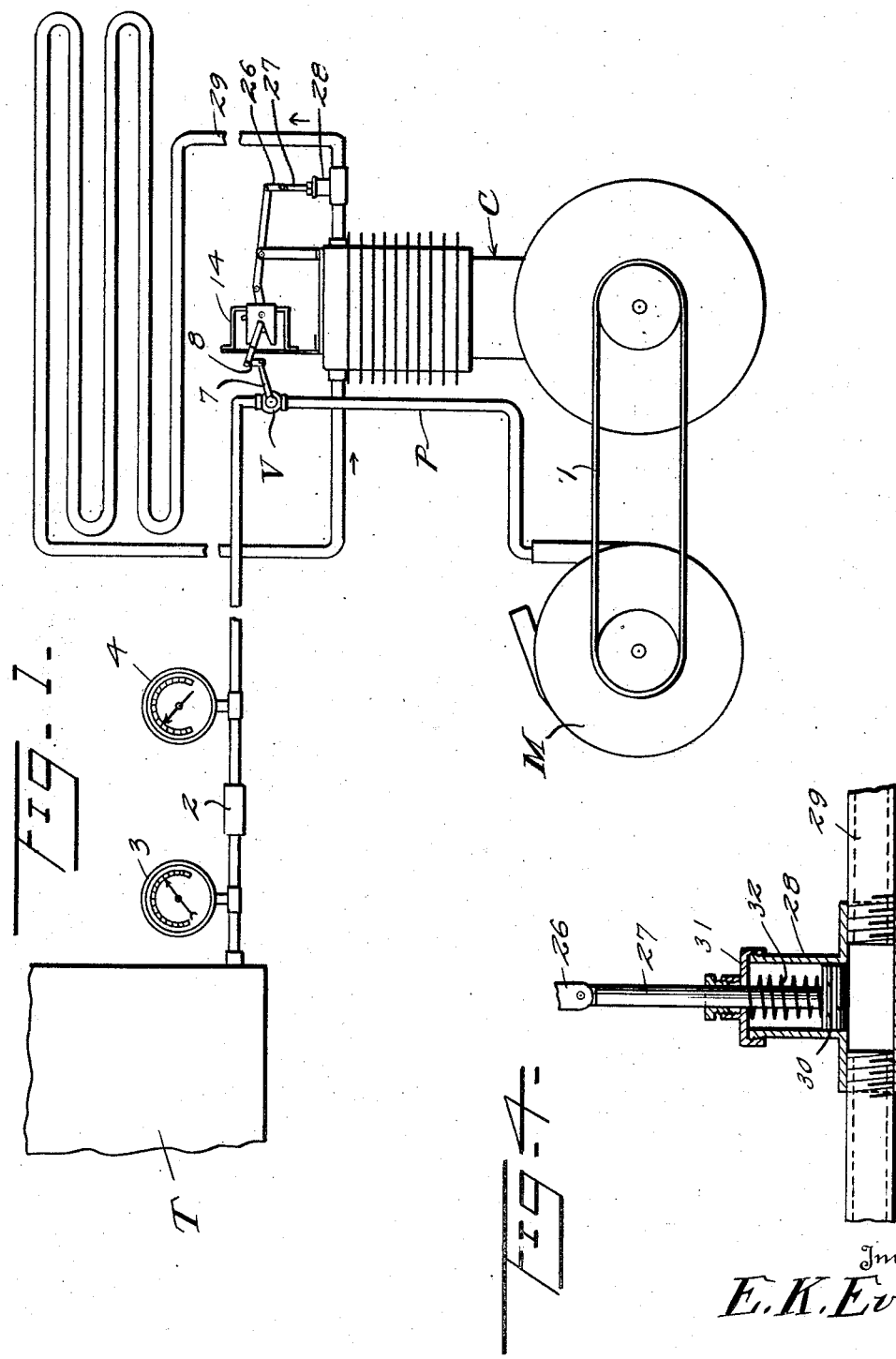
Inventor
E. K. Evans
By Watson E. Coleman

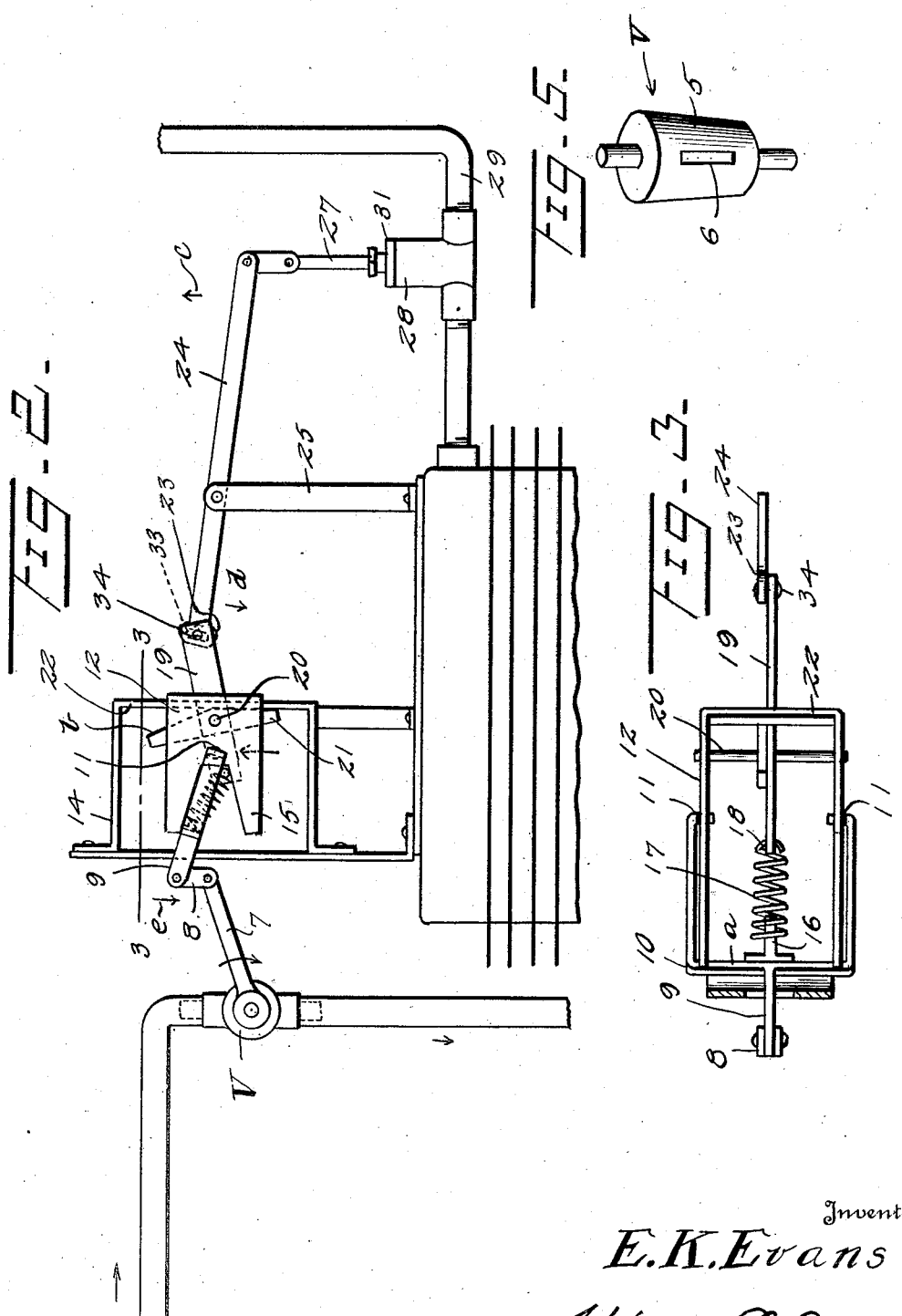

Patented Nov. 4, 1930

1,780,583

UNITED STATES PATENT OFFICE

ERWIN KENT EVANS, OF HOLLAND PATENT, NEW YORK

AUTOMATIC PRESSURE-CONTROLLING APPARATUS

Application filed September 8, 1928. Serial No. 304,664.

This invention relates to mechanical refrigerators and it is primarily an object of the invention to provide an apparatus of this character wherein air under pressure is employed as the motive force, together with means under control of the rise and fall of the temperature within the refrigerator for controlling the action of such compressed air.

It is also an object of the invention to provide a device of this kind wherein the compressor as comprised in the refrigerating unit is in driven connection with a motor, said motor being operated by air under pressure, together with means operating under thermo changes for controlling the operation of such motor.

An additional object of the invention is to provide a unit for a mechanical refrigerator which can be employed to advantage in such localities where electricity is not available and which apparatus is also particularly adapted for use on the farm.

The invention consists in the details of construction and in the combination and arrangement of the several parts of my improved mechanical refrigerator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diagrammatic view illustrating a refrigerating unit assembled in accordance with an embodiment of my invention;

Figure 2 is an enlarged view in elevation illustrating the means as herein employed for controlling the delivery of the motive force to the engine incident to the thermo changes;

Figure 3 is a sectional view taken substantially on the line 3—3 of Figure 2;

Figure 4 is a fragmentary view partly in section and partly in elevation illustrating the pressure control as herein employed;

Figure 5 is a view in elevation of the valve interposed in the air line unapplied.

As disclosed in the accompanying drawings, C denotes a compressor of any desired type which is employed in connection with mechanical refrigeration and which is in driven connection through the medium of a belt 1 or the like with a motor M. This motor M may be a turbine or otherwise as preferred and is of a type to be readily operated by air under pressure. This air is delivered as required to the motor M through the pipe line P leading from a tank T containing a supply of air under pressure. This tank T may have the required air compressed therein in any way preferred, as by a compressor driven by a gas engine or otherwise.

The pipe line P has interposed therein a reducing valve 2 of any desired kind which serves to assure the delivery of the air to the motor M at a desired pressure less than the pressure within the tank T. For example, the pressure within the tank T may be two thousand pounds whereas it may only require fifty pounds pressure to operate the motor M. The pipe line P has interposed therein between the tank T and the valve 2 a pressure gauge 3 to indicate the degree of pressure within the tank T and to the opposite side of the valve 2 the pipe line P has interposed therein a pressure gauge 4 so that by it may be readily determined the pressure of the air being conveyed to the motor M.

The pipe line P also has interposed therein a controlling valve structure V which is adapted to be automatically operated to open and close the pipe line in a manner to be hereinafter more particularly referred to. This valve structure V includes a rotary valve member 5, as particularly illustrated in Figure 5, which has disposed therethrough a relatively narrow slotted opening 6 so that in order to effect an opening or closing of the pipe line P it is only required to impart a rotary movement to the valve member 5 substantially equal to the width of the slotted opening 6.

The valve member 5 has operatively engaged therewith an operating handle 7, said handle, as herein disclosed, being connected by a link 8 with an outstanding arm 9 carried by a U-shaped member or yoke 10. This member or yoke 10 has its free extremities pivotally connected, as at 11, with a pair of spaced parallel plates 12 carried by a supporting bracket 14 herein disclosed as mounted directly upon the compressor C.

The side plates 12 have their outer or free end portions bifurcated to provide spaced arms 15 between which moves or swings the intermediate bar $a$ of the member or yoke 10 whereby the extent of swinging movement of the member or yoke 10 is limited in both directions by contact of the member or cross bar $a$ with either of the arms 15. The central portion of the cross bar $a$ of the member or yoke 10 is provided with an inwardly directed tongue or lug 16 which is telescopically received within an end portion of an expanding coil spring 17, the opposite end of said spring being anchored, as at 18, to an end portion of an elongated arm 19. This arm 19 at a desired point intermediate its ends is supported for swinging movement upon a pin 20 bracing the space between the plates 12 closely adjacent to their inner ends. The arm 19 at its portion mounted upon the pin 20 is provided with a cross bar 21, the rear edges of which being oppositely beveled from the longitudinal center thereof, as indicated at $b$ in Figure 2. The angles of the bevels $b$ are such as to limit the swinging movement of the arm 19 in either direction by contact with the adjacent member 22 of the supporting bracket or frame 14.

The outer end portion of the arm 19 is operatively connected, as at 23, with an end portion of a lever 24. This lever 24 at a desired point intermediate its ends is supported for rocking movement by an arm 25 herein disclosed as mounted directly upon the compressor C. The opposite end portion of the lever 24 is operatively connected through the medium of a link 26 with the outer end portion of a stem 27 comprised in the pressure control. This pressure control includes a cylinder 28 interposed in the refrigerant line 29 and in communication therewith.

Working in the cylinder 28 is a piston 30 carried by the inner or inserted end portion of the stem 27. Arranged within the cylinder 28 and interposed between the piston 30 and the outer end or head 31 of the cylinder 28 is a coil spring 32 of a predetermined tension and which normally maintains the piston 30 at the limit of its movement toward the refrigerant line 29.

In operation as the temperature rises within the cooling chamber the fluid within the line 29 will expand and such expansion will move the piston 30 outwardly of the cylinder 28, resulting in a rocking movement of the lever 24 in the direction of the arrow $c$ and a downward movement at the connection 23 between the lever 24 and the arm 19 as indicated by the arrow $d$. As the arm 19 is brought to the horizontal and passes the horizontal the spring 17 will operate to throw the arm 9 downwardly as indicated by the arrow $e$, whereupon the arm 7 will be swung in a direction to open the valve structure V. With the valve structure V open the air from the tank T will be delivered to the motor M to cause the same to function in order to operate the compressor C. As the temperature in the cooling chamber decreases and the temperature of the fluid within the pipe line 29 correspondingly contracts, the spring 31 will operate to return the piston 30 to its normal position whereupon the operation hereinbefore referred to will be reversed and the arm 7 swung into a position to close the valve structure V whereupon the motor M together with the compressor C will become inactive.

In order to facilitate the effective throw of the arm 9 together with the U-shaped member or yoke 10, it is to be noted that the end portion of the lever 24 comprised in the connection 23 is provided with an elongated transversely disposed slot 33 through which is freely directed the coupling pin 34 carried by the arm 19.

It is to be noted that an end portion of the cross bar 21 has contact with the adjacent member 22 at substantially the same moment the cross bar $a$ of the member or yoke 10 contacts with either set of arms 15.

From the foregoing description it is thought to be obvious that a mechanical refrigerator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a pipe line and a controlling valve interposed therein, a yoke supported for swinging movement, means for operatively connecting said yoke with the valve to move the valve into open position when the yoke moves in one direction and to move the valve into closed position when said yoke moves in the opposite direction, an arm supported intermediate its ends for swinging movement, an expansible spring interposed between an end portion of said arm and the swinging yoke, and means for imparting swinging movement to the arm.

2. In combination with a pipe line and a controlling valve interposed therein, a yoke supported for swinging movement, means for operatively connecting said yoke with the valve to move the valve into open position when the yoke moves in one direction and to move the valve into closed position when said yoke moves in the opposite direction, an arm supported intermediate its ends for swinging movement, an expansible spring interposed between an end portion of said arm and the swinging yoke, and means for imparting swinging movement to the arm, said yoke having swinging movement under the influence of the spring upon swinging movement of the arm a predetermined distance.

3. In combination with a pipe line and a controlling valve interposed therein, a yoke supported for swinging movement, means for operatively connecting said yoke with the valve to move the valve into open position when the yoke moves in one direction and to move the valve into closed position when said yoke moves in the opposite direction, an arm supported intermediate its ends for swinging movement, an expansible spring interposed between an end portion of said arm and the swinging yoke, means for imparting swinging movement to the arm, said yoke having swinging movement under the influence of the spring upon swinging movement of the arm a predetermined distance, and means for limiting the swinging movement of the yoke.

4. In combination with a pipe line and a controlling valve interposed therein, a yoke supported for swinging movement, means for operatively connecting said yoke with the valve to move the valve into open position when the yoke moves in one direction and to move the valve into closed position when said yoke moves in the opposite direction, an arm supported intermediate its ends for swinging movement, an expansible spring interposed between an end portion of said arm and the swinging yoke, means for imparting swinging movement to the arm, said yoke having swinging movement under the influence of the spring upon swinging movement of the arm a predetermined distance, and means for limiting the swinging movement of the arm.

In testimony whereof I hereunto affix my signature.

ERWIN KENT EVANS.